United States Patent

[11] 3,603,815

[72] Inventor Ramachandra Aragula Rao
Wallington, Surrey, England
[21] Appl. No. 725,460
[22] Filed Apr. 30, 1968
[45] Patented Sept. 7, 1971
[73] Assignee U.S. Philips Corporation
New York, N.Y.
[32] Priority May 2, 1967
[33] Great Britain
[31] 20,191/67

[54] BISTABLE CIRCUITS
3 Claims, 4 Drawing Figs.

[52] U.S. Cl. ........................................ 307/247, 307/289, 307/291, 307/292, 328/206
[51] Int. Cl. ........................................ H03k 3/12
[50] Field of Search ........................................ 307/247, 289, 291, 292, 218; 328/206

[56] References Cited

UNITED STATES PATENTS

| | | | |
|---|---|---|---|
| 3,428,830 | 2/1969 | McEuoy | 328/206 |
| 3,430,070 | 2/1969 | Marshall | 307/247 |
| 3,458,825 | 7/1969 | Lagemann | 307/247 |
| 3,435,257 | 3/1969 | Lawrie | 307/247 |
| 3,510,784 | 5/1970 | Weber | 328/196 |

*Primary Examiner*—Donald D. Forrer
*Assistant Examiner*—David M. Carter
*Attorney*—Frank R. Trifari

ABSTRACT: An additional AND-gate connected to the clock pulse input of a J–K flip-flop provides an inhibiting input to each of the J and K input AND-gates in response to a clock pulse received before a flip-flop switching input is applied to the J–K input gates. The inhibiting input prevents the flip-flop from reversing state in response to a switching input applied during a clock pulse, and permits a change of state only if the switching input is received by the flip-flop before the application of the clock pulse.

INVENTOR

RAMACHANDRA A. RAO

BY

AGENT

INVENTOR

RAMACHANDRA A. RAO

BY Frank R. Trifari
AGENT

INVENTOR

RAMACHANDRA A. RAO

BY Frank R. Trifari

AGENT

BISTABLE CIRCUITS

The present invention relates to flip-flops and more particularly to those which operate on a master-slave technique and which are capable of counting at over 100 megacycles.

The circuit has been designed to operate under conditions of slow rise and fall times in the clock pulse edges, and also skew in the clock pulse, at a speed of 100 mc./s. The circuit is also particularly suitable for manufacture in the form of an integrated circuit.

According to the present invention there is provided a clocked flip-flop of the master-slave type including an input gate for the clock pulse and an input gate for each of the two signal pulses, a master flip-flop, the inputs of which are derived from the outputs of the signal input gates, a slave flip-flop, the inputs to which are obtained from two internal gates, each of which internal gates is fed by a different one of the two complementary outputs of the master flip-flop, and an output buffer circuit which is connected in parallel with the slave flip-flop.

An embodiment of the present invention will now be described, by way of example, with reference to the accompanying drawings in which.

Though the invention will be explained by way of example in view of JK-flip-flop it may be emphasized that the invention is also applicable on DV or JKDV flip-flops.

Figure 1:
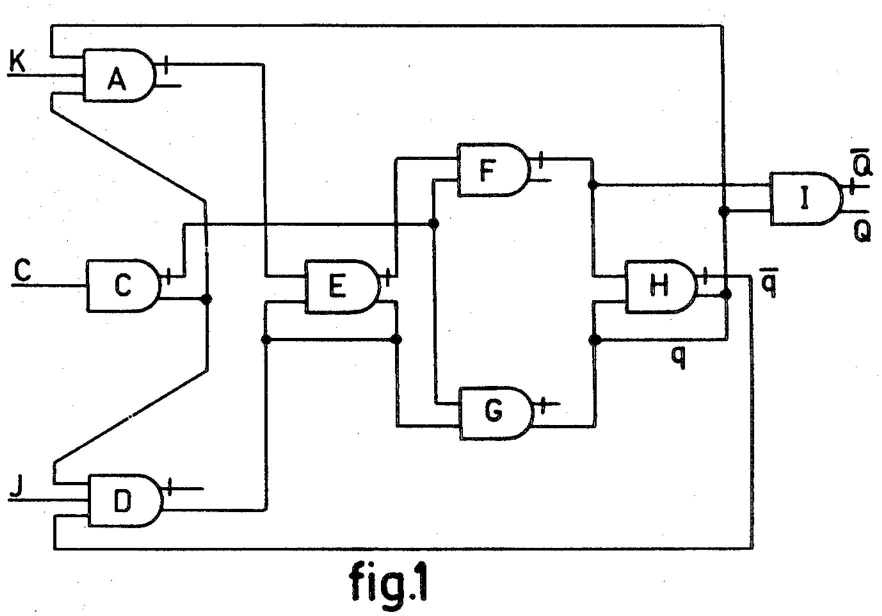
FIG. 1 shows a basic block diagram of the circuit according to the invention.

Referring now to FIG. 1, there is shown the basic flip-flop with two inputs in this example of a JK flip-flop, inputs J and K and a clock pulse input C. The clock pulse C is fed into a gate C which produces complementary outputs for the clock pulse, the noninverted one of which is fed to input terminals of the signal input gates A and D. It may be noted at this point that the outputs shown marked with a bar across the output line are the NOT or inverted outputs for the circuits.

The inverted output of gate A and the noninverted output of gate D are fed to circuit E which is the master flip-flop. The symbol used for the flip-flop E represents a normal type of gating circuit, such as A, C or D with the noninverted output connected by a feedback loop to one of the inputs.

The inverted and noninverted outputs of circuit E are fed to the input of gates F and G respectively, which gates are also fed by the inverted clock pulse from gate C. The inverted output from gate F and the noninverted output from gate G are fed to an input of circuit H, which is the slave flip-flop and which is similar in construction to the master flip-flop E. The inverted output of gate F and the noninverted output of gate G are also fed to the input of an output gating circuit I.

The outputs of the slave flip-flop H, $q$ and $\bar{q}$ are fed to the inputs of the gating circuits A and D respectively. The operation of this basic version of the flip-flop will be better understood by reference to the following description of a cycle of operations.

In the absence of a clock pulse, the inputs to the gates A and D will have no effect on any of the succeeding gates. This is because gates A and D are both AND gates. The inverted output of gate A and the noninverted output of gate D are fed to the master flip-flop E. Assume the inverted output of A is 1 and the noninverted output of D is 0. Under these conditions the inverted output of gate E is assumed to be 1 and the noninverted output is assumed to be 0. The output of the gate D is changed when a change in the input signal conditions takes place and when the clock pulse is present. In this case the change takes place when 1 appears at the J input as the former condition was with an 0 at the J input.

If prior to the clock pulse, the input J was 1 or if the J input changes to 1 during the time that the clock pulse is present, then on the arrival of the clock pulse the output for D changes to 1, and alters the state of the flip-flop E, the inverted output becoming 0 and the noninverted output becoming 1. The flip-flop E will be locked in this state at the end of the clock pulse period. The output of the gate A remains at 1 by virtue of the output $q$, from the gate H being 0. During the period of the clock pulse the outputs of the gates F and G remain the same since the inputs are connected to the inverted output of gate C which is always at 0 during the period of any clock pulse. On removal of the clock pulse the inverted output of gate C will revert to 1, the noninverted output from gate G will be changed to 1 and the inverted output of gate F will remain at 1. The outputs $q$ and Q will change to 1 and the outputs $\bar{q}$ and $\bar{Q}$ will change to 0. During the next clock pulse the gate D will be inhibited by the output $\bar{q}$ of gate H and the gate A will be activated if the value of K is 1. If K is 1, output of gate A will change to zero thereby changing the state of gate E. The outputs of gate I, which are the final outputs for the circuit only change at the end of each clock pulse.

Figure 4:
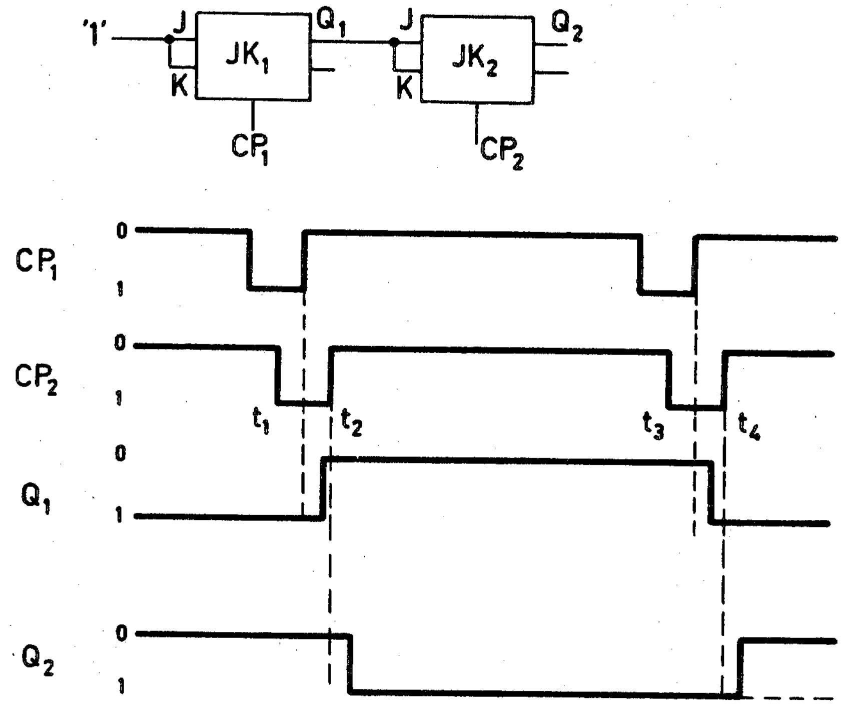
FIG. 4 shows how skew in the clock pulse can produce errors in the functioning of the basic circuit of FIG. 1.

As may be seen with reference to FIG. 4 skew in the clock pulse can produce errors in the output of the basic flip-flop of FIG. 1. The circuit of FIG. 4 shows two flip-flops $JK_1$ and $JK_2$ which are fed by two clock pulses $CP_1$ and $CP_2$ respectively. The clock pulse $CP_2$ is assumed to be delayed with respect to the clock pulse $CP_1$ as shown in the drawing. The output $Q_1$ of the flip-flop $JK_1$ is used to drive the input of the circuit $JK_2$, as would be typical in a counting circuit.

The input to $JK_1$ is assumed to be a 1. Thus, assuming $CP_2$ were not delayed during two clock pulse periods where $CP_1$ occurs simultaneously with $CP_2$ the output of $JK_1$ should change twice and the output of $JK_2$ should only change once. After the end of the first of the $CP_2$ clock pulses, i.e., $t_2$ the flip-flop $JK_2$ changes state. The short delay is due to the time taken for the master to pass on its information to the slave. This is the correct operation, the flip-flop $JK_2$ having responded to the 1 output from the $Q_1$ terminal of $JK_1$. During the whole of the next clock pulse period of the flip-flop $JK_2$ should receive a 0 from $JK_1$. However, due to the misalignment or skew in the clock pulse timings as shown in FIG. 4 the output $Q_1$ of $JK_1$ changes from 0 to 1 during the $CP_2$ clock pulse period. The flip-flop $JK_2$ thus responds to the 1 input as shown, which produces a false result at the output of $JK_2$.

The false result is produced only when a relevant input signal changes from 0 to 1 during a clock pulse period, since if the input is 1 at the start of a clock pulse period the JK flip-flop responds to the initial information and will not be effected by any subsequent changes, providing of course that the input information is present for the latch time of the circuit.

Figure 2:
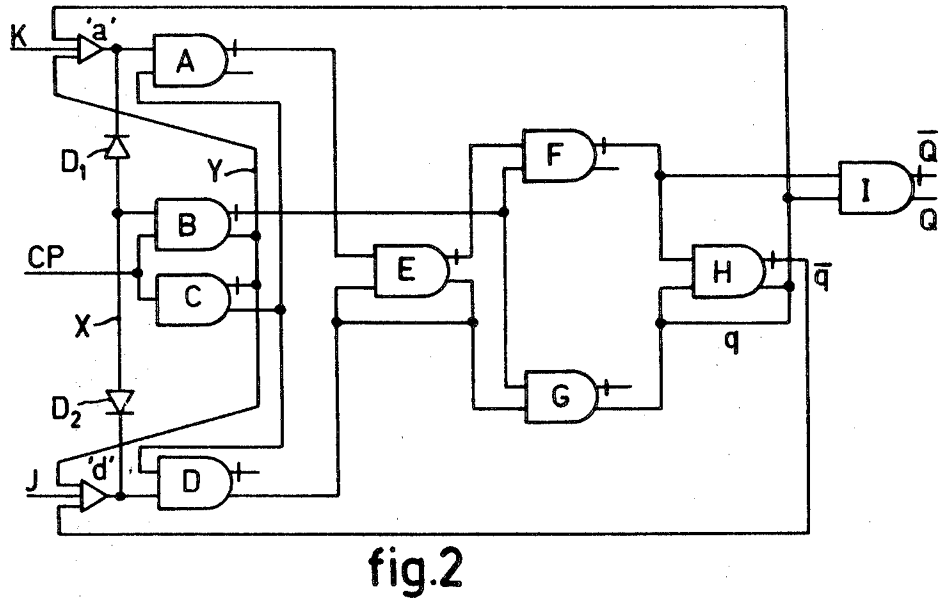
FIG. 2 shows the circuit of FIG. 1, modified for clock pulse skew protection.

The circuit of FIG. 2 is designed to cope with the situation when the input pulse changes from a 0 to a 1 during the period of a clock pulse. This will be due in the majority of cases to skew in the clock pulse.

Figure 3:
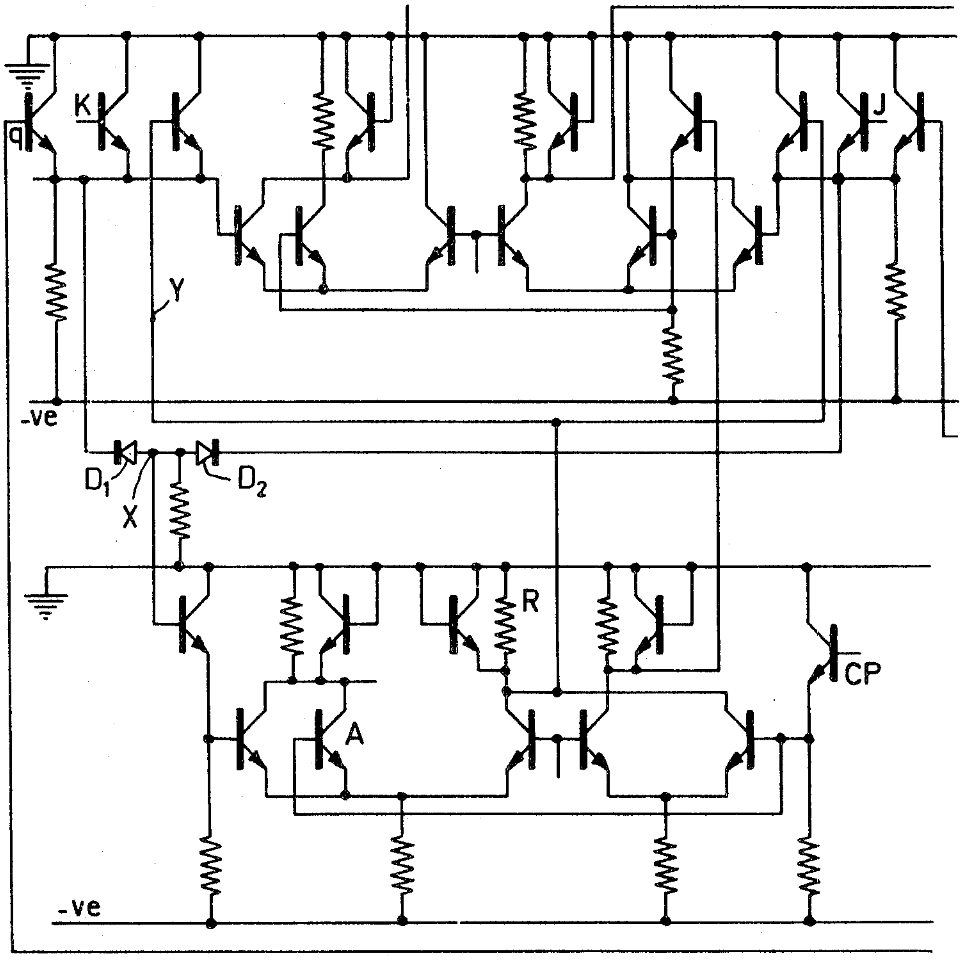
FIG. 3 shows the circuit diagram for the arrangement of FIG. 2.

The component parts of the circuit of FIG. 2 which perform the same functions as in FIG. 1 are given the same reference letters. A further input gate B is introduced together with two emitter followers "$a$" and "$d$" and two diodes $D_1$ and $D_2$. The gates "$a$" and "$d$" are input emitter followers of the gates A and D of FIG. 1, they are shown separately in FIG. 2 in order to ease the description. The connection of the diodes $D_1$ and $D_2$ may be more clearly seen in FIG. 3 which is the complete circuit diagram for a circuit performing the same functions as FIGS. 2. The following initial conditions for the circuit are assumed:

$$q=1, \quad \bar{q}=0, \quad CP=0, \quad K=1,$$

As $q=0$ the input J can have no effect on the circuit, the input K being the controlling influence.

In the absence of a clock pulse the line Y will sit at the 1 level, since the output of gates C and B are fed through a common resistor R (see FIG. 3) to line Y and the inverted output of gate C is a 1 which holds the line Y in the 1 state. Since all the inputs to the emitter follower "$a$" are 1 then the output of "$a$" is 1. Thus the input to gate B from line X is a 1.

On the arrival of the clock pulse, both inputs to gate B are made equal to 1 and the noninverted output of B is a 1 which maintains line Y at the 1 level. The gate A is opened by the noninverted clock pulse from gate C and the 1 at the K input is processed into the master flip-flop E.

The operation, as always, for gate D and the J input is similar in all respects as the operation for the gate A and the K input.

Consider now the case when the input $K=0$. The line Y will sit at the 1 level since the output of gates C and B are fed through the common resistor R to line Y and the inverted output of gate C is a 1 which holds line Y in the 1 state. The line X is in the 0 state as the $K$ input is 0.

When the clock pulse arrives the line Y is allowed to change to a 0 condition since one of the inputs to the gate B is at 0. The information at the output of the emitter follower "$a$" is seen by gate A and if gate A sees a 0 it is locked to the state before the clock pulse arrives. The noninverted output of gate C which supplies the clock pulse to gates A and D will still be at 1, but any change in the information on the K line during the clock pulse period at the input to "$a$" will not be transferred due to the inhibition imposed on "$a$" by the line Y changing to the 0 condition. Thus if the input condition changes to 1 after the start of the clock pulse the flip-flop will take no action and the effect of skew in the clock pulses will be minimized. The lockout time for gate A is approximately 1 nanosecond, i.e., the time in which a change in K during a clock pulse period is accepted is reduced to less than 1 nanosecond.

What is claimed is:

1. A clocked flip-flop assembly, comprising a master flip-flop, a slave flip-flop, means responsive to the absence of a clock pulse for conducting the output of the master flip-flop to the slave flip-flop, a first AND-gate, a second AND-gate, a first clock pulse gate connected to the first and second AND-gates for providing enabling signals to the first and second AND-gates in response to the absence of a clock pulse, a second clock pulse gate responsive to the concurrance of a clock pulse and an output from either of the first and second AND-gates for providing an enabling signal to both the first and second AND-gates, whereby the absence of an output from the first and second AND-gates before the initiation of a clock pulse prevents the first and second AND-gates from producing an output during a clock pulse, a third AND-gate responsive to the concurrance of the presence of a clock pulse and an output from the first AND-gate for triggering the master flip-flop into a first state, and a fourth AND-gate responsive to the concurrance of the presence of a clock pulse and an output from the second AND-gate for triggering the master flip-flop into a second state.

2. A logic circuit for preventing a clocked flip-flop from being affected by a binary input signal initiated during a clock pulse period comprising a first gate means for providing a first enabling signal in response to the absence of a clock pulse, a second AND-gate means for conducting the binary input signal to an output terminal and to the clocked flip-flop in response to the concurrance of an enabling signal and the binary input signal, a third AND-gate means connected to the output of the second AND-gate means for providing a second enabling signal in response to the concurrance of a binary signal on the output terminal of the second AND-gate means and the presence of a clock pulse, and means for connecting the first and second enabling signals from the first and third gates to an input terminal of the second gate.

3. A clocked flip-flop of the master slave type, comprising a first gate means having an input terminal, and a first and second output terminal for providing an enabling output on the first output terminal in response to the presence of a clock pulse and for providing an enabling signal on the second output terminal in response to the absence of a clock pulse, a second AND-gate means having an input terminal connected to the second output terminal of the first AND-gate means and having a second input terminal for the reception of a first binary input signal and a third input terminal for the reception of a first feedback signal, a third input AND-gate means having a first input terminal connected to the second output terminal of the first AND-gate means, a second input terminal for the reception of a second binary input signal and a third input terminal for the reception of a second feedback signal, a fourth AND-gate means having a first input terminal for the reception of clock pulses and a second input terminal connected to the output terminals of the second and third AND-gates for providing an enabling output on a first output terminal in response to the concurrance of a clock pulse and an output from either of the second and third AND-gates and for providing an enabling signal on a second output terminal in response to the absence of an output signal from both the second and third AND-gates or the absence of a clock pulse, whereby the second and third AND-gates are prevented from passing any bivalent input signals occurring after the reception of a clock pulse, the clocked flip-flop further comprising a master flip-flop, a fifth AND-gate having an input terminal connected to the output terminal of the second AND-gate and to the first output terminal of the first AND-gate for passing the output of the second AND-gate to an input terminal of the master flip-flop in response to the enabling output on the first terminal of the first AND-gate, a sixth AND-gate having an input terminal connected to the output terminal of the third AND-gate and a second input terminal connected to the first output of the first AND-gate for passing the output of the third AND-gate to an additional terminal of the master flip-flop in response to the enabling output on the first output terminal of the first AND-gate, a slave flip-flop, means connected to the output of the master flip-flop and to the input of the slave flip-flop and further connected to the second output of the fourth AND-gate for passing the output of the master AND-gate to the slave AND-gate in response to an enabling system on the second output terminal of the fourth AND-gate, feedback means for connecting a first output terminal of the slave flip-flop to the third input terminal of the second AND-gate whereby the first feedback signal is provided for the second AND-gate, and means for connecting a complementary output of the slave flip-flop to the third input terminal of the third AND-gate whereby the second feedback signals are provided.